(12) United States Patent
Youn et al.

(10) Patent No.: US 8,514,810 B2
(45) Date of Patent: Aug. 20, 2013

(54) METHOD FOR PERFORMING BAND HANDOVER IN BROADBAND WIRELESS ACCESS SYSTEM AND MOBILE STATION SUPPORTING THE SAME

(75) Inventors: Ae Ran Youn, Gyeonggi-do (KR); Sung Woong Ha, Gyeonggi-do (KR); Gi Won Park, Gyeonggi-do (KR); Gene Beck Hahn, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 292 days.

(21) Appl. No.: 12/678,248

(22) PCT Filed: Sep. 18, 2008

(86) PCT No.: PCT/KR2008/005515
§ 371 (c)(1),
(2), (4) Date: Mar. 15, 2010

(87) PCT Pub. No.: WO2009/038361
PCT Pub. Date: Mar. 26, 2009

(65) Prior Publication Data
US 2010/0208695 A1    Aug. 19, 2010

(30) Foreign Application Priority Data
Sep. 18, 2007    (KR) .......................... 10-2007-0094802

(51) Int. Cl.
*H04W 4/00*    (2009.01)
*H04J 11/00*    (2006.01)

(52) U.S. Cl.
USPC ............ 370/331; 370/328; 370/208; 370/341

(58) Field of Classification Search
None
See application file for complete search history.

(56) References Cited

U.S. PATENT DOCUMENTS

| | | | |
|---|---|---|---|
| 5,317,623 A | 5/1994 | Sakamoto et al. | |
| 7,542,765 B2 * | 6/2009 | Kwun et al. | 455/436 |
| 2005/0101326 A1 * | 5/2005 | Kang et al. | 455/436 |
| 2005/0113129 A1 | 5/2005 | Robinson | |
| 2005/0250498 A1 * | 11/2005 | Lim et al. | 455/436 |

\* cited by examiner

*Primary Examiner* — Kevin C Harper
*Assistant Examiner* — Samina Choudhry
(74) *Attorney, Agent, or Firm* — Birch, Stewart, Kolasch & Birch, LLP

(57) ABSTRACT

A method for performing band handover in a broadband wireless access system is provided. In this method, a terminal in a band AMC mode in which the terminal transmits and receives data through a band selected from among bands to which a modulation scheme and a coding rate are adaptively applied receives channel status information of each band of a neighboring base station. The terminal then performs handover to the neighboring base station while maintaining the band AMC mode if it is determined based on the received channel status information that a channel status of each band of the neighboring base station satisfies a predetermined condition. This band handover method enables handover to be performed for each specific frequency band of a mobile terminal.

8 Claims, 4 Drawing Sheets

METHOD FOR PERFORMING BAND HANDOVER IN BROADBAND WIRELESS ACCESS SYSTEM AND MOBILE STATION SUPPORTING THE SAME

TECHNICAL FIELD

The present invention relates to a broadband wireless access system, and more particularly, to a method for performing band handover in a broadband wireless access system and a mobile terminal (or mobile station) supporting the same.

BACKGROUND ART

When a mobile terminal performs handover in a broadband wireless access system, the mobile terminal performs the handover for all frequency regions regardless of subcarrier allocation scheme. To perform handover, first, the mobile terminal receives information of neighboring base stations from a current serving base station. The mobile terminal then requests that handover to a neighboring base station be performed when it is determined based on the received neighboring base station information that the neighboring base station provides a higher signal or service quality than the current serving base station.

A mobile terminal, which is transmitting and receiving data using a specific band, also switches to a normal mode in which subcarriers are allocated to all frequency regions before and after handover is performed. After the handover is performed, the mobile terminal requests switching to a data transmission/reception mode or the base station switches the mobile terminal from the normal mode to a mode, in which data is transmitted and received using only a specific band, based on channel status information transmitted from the mobile terminal.

A mobile terminal located at a cell boundary frequently performs handover. Especially, a mobile terminal which transmits and receives data using only a specific band among those located at cell boundaries will frequently switch, after handover is performed, from the normal mode to a mode in which only the specific band is used to transmit and receive data more than a number of times corresponding to the number of handovers. This causes problems in that power of the mobile terminal is wasted and resources are used inefficiently.

DISCLOSURE

Technical Problem

An object of the present invention is to provide a band handover method to solve the above problems and to provide a mobile terminal to which the band handover method can be applied.

Technical Solution

In one embodiment of the present invention, the object of the present invention can be achieved by providing a method for performing band handover in a broadband wireless access system, the method including a terminal receiving channel status information of each band of a neighboring base station, the terminal operating in a band AMC mode in which the terminal transmits and receives data through a band selected from among bands to which a modulation scheme and a coding rate are adaptively applied, and performing handover to the neighboring base station while maintaining the band AMC mode if it is determined based on the received channel status information that a channel status of each band of the neighboring base station satisfies a predetermined condition.

In another embodiment of the present invention, provided herein is a method for performing band handover in a broadband wireless access system, the method including a terminal receiving channel status information of each band of a neighboring base station, the terminal performing data transmission and reception through a band selected from among bands that can be allocated in the broadband wireless access system, and performing handover to the neighboring base station, if it is determined based on the received channel status information that a channel status of each band of the neighboring base station satisfies a predetermined condition, to perform data transmission and reception through the selected band to and from the neighboring base station.

In the above two embodiments, the method may further include receiving channel status information of each band from the neighboring base station after performing handover to the neighboring base station. Here, the channel status information of each band received after performing the handover may be a change in the channel status information of each band from the channel status information received before performing the handover.

The channel status information may be a Carrier to Interference and Noise Ratio (CINR) value. In this case, the predetermined condition may be that a maximum value of a standard deviation of a CINR of each band measured from the neighboring base station is less than a threshold value for band AMC allocation and an average CINR of all frequency bands of the neighboring base station is greater than a band AMC-enter average CINR (an average CINR for entering the band AMC mode).

In another embodiment of the present invention, provided herein is a mobile terminal for performing handover in a broadband wireless access system, the mobile terminal including a receiver for receiving channel status information of each band of a neighboring base station, the terminal operating in a band AMC mode in which the terminal transmits and receives data through a band selected from among bands to which a modulation scheme and a coding rate are adaptively applied, and a controller for controlling the mobile terminal to perform handover to the neighboring base station while maintaining the band AMC mode if it is determined based on the received channel status information that a channel status of each band of the neighboring base station satisfies a predetermined condition.

In this case, the receiver may receive channel status information of each band from the neighboring base station after performing handover to the neighboring base station and the channel status information of each band received after performing the handover may be a change in the channel status information of each band from the channel status information received before performing the handover.

Here, the channel status information may also be a Carrier to Interference and Noise Ratio (CINR) value. In this case, the predetermined condition may also be that a maximum value of a standard deviation of a CINR of each band measured from the neighboring base station is less than a threshold value for band AMC allocation and an average CINR of all frequency bands of the neighboring base station is greater than a band AMC-enter average CINR.

Advantageous Effects

According to the method for performing band handover in a broadband wireless access system described in the present invention, it is possible to perform handover for each specific frequency band of a mobile terminal.

In addition, a channel status of each band of a mobile terminal that performs handover is quickly reflected to adaptively apply a modulation method or a coding rate so that resources can be more efficiently used.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1A:
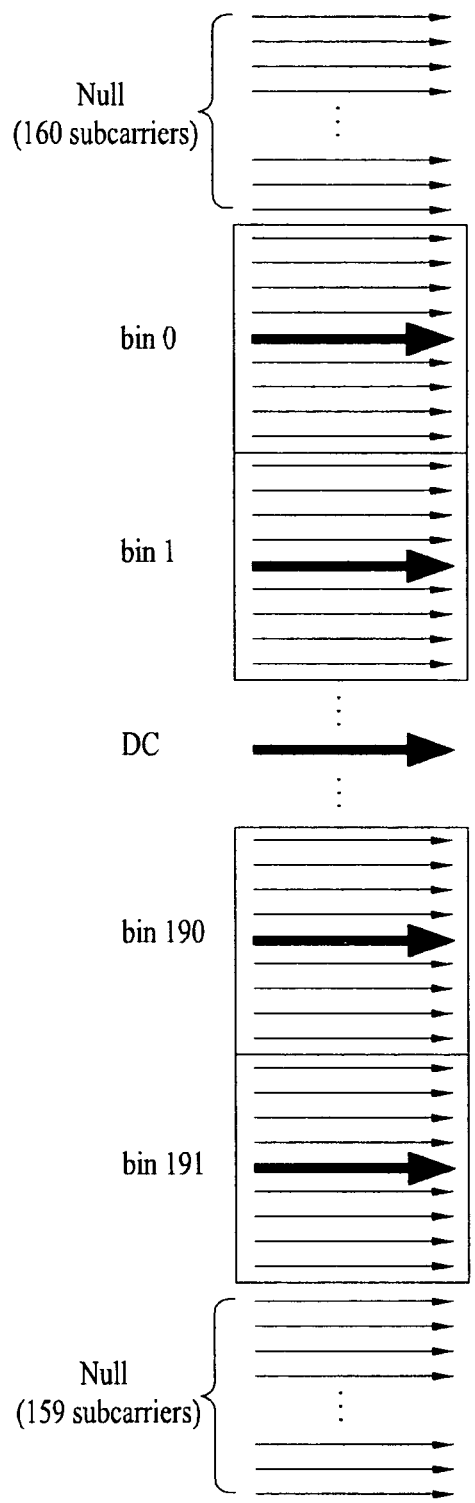
FIGS. 1A and 1B illustrate an example configuration of channel bands in a band AMC mode.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following description will be given with reference to specific terms, the present invention is not necessarily limited to the specific terms and other terms may also be used to indicate the same meanings.

In some instances, known structures and devices are omitted or are shown in block diagram form, focusing on important features of the structures and devices, so as not to obscure the concept of the present invention. The same reference numbers will be used throughout this specification to refer to the same or like parts.

The above embodiments are provided by combining components and features of the invention in specific forms. The components or features of the invention should be considered optional if not explicitly stated. The components or features may be implemented without being combined with other components or features. The embodiments of the invention may also be provided by combining some of the components and/or features. The order of the operations described above in the embodiments of the invention may be changed. Some components or features of one embodiment may be included in another embodiment or may be replaced with corresponding components or features of another embodiment.

The technologies described below can be used for various communication systems. Communication systems are widely deployed to provide various communication services such as voice and packet data.

The above embodiments of the present invention have been described focusing on the data communication relationship between a terminal and a base station. The base station is a terminal node in a network which performs communication directly with the terminal. Specific operations which have been described as being performed by the base station may also be performed by upper nodes as needed. That is, it will be apparent to those skilled in the art that the base station or any other network node may perform various operations for communication with terminals in a network including a number of network nodes. The term "base station" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

In a normal wireless state, a mobile terminal operates in a diversity subchannel mode in which it transmits and receives data over all frequency bands. Then, the mobile terminal can transmit and receive data using a selected band if a preset condition is satisfied. Specifically, the mobile terminal collects channel quality information (CQI) of currently-used subchannels and performs data transmission using a band including a specific number of subchannels in good states selected based on the collected CQI.

In this case, according to an embodiment of the present invention, the mobile terminal can request and perform band handover. Specifically, the mobile terminal can collect channel status information of each band of neighboring base stations before performing handover and then can perform band handover based on the collected channel status information.

When data is transmitted and received through a specific band, a modulation scheme and a coding rate can be separately applied to each band. The mode in which a modulation scheme and a coding rate are separately and adaptively applied to each band is referred to as a "band AMC mode (or band AMC subchannel mode)". A Modulation & Coding Set (MCS) including a set of modulation scheme and coding rate levels can be defined and used to adaptively apply a modulation scheme and coding rate to each band.

A procedure for switching to a band AMC mode is performed in the following manner. First, while operating in a default diversity mode, a mobile terminal measures CQI of a base station and collects respective CQI of currently-used subchannels. The mobile terminal then selects 4 or 5 subchannels with the best channel states (also referred to as "best subchannels") from among the currently-used subchannels and requests that the base station switch to a band AMC mode. The base station then determines whether to accept the request according to a preset policy such as resource management rules and transmits an acknowledgement (ACK) message to the mobile terminal to permit the switching to the band AMC mode.

When a Carrier to Interference and Noise Ratio (CINR) is used as the channel quality information, the mobile terminal reports respective CINRs of 4 or 5 bands with the best channel states to the base station and the base station then allocates band AMC subchannels to the reported best bands.

Thereafter, the mobile terminal periodically collects channel quality information of each subchannel. Here, the mobile terminal can report only a incremental value of the collected channel quality information of the best bands from the previously collected channel quality information thereof to the base station. Herein, the 'incremental' may indicate a negative value or a positive value.

It is difficult for a mobile terminal which is moving at a high speed to report respective CINRs of bands. However, transmitting and receiving data in the band AMC mode as described above has advantages over the conventional diversity mode in that robustness against noise and interference with neighboring cells is increased and the coding rate is also increased so that the transfer rate is increased since only a band including high-quality subchannels is used in the band AMC mode.

Figure 1B:
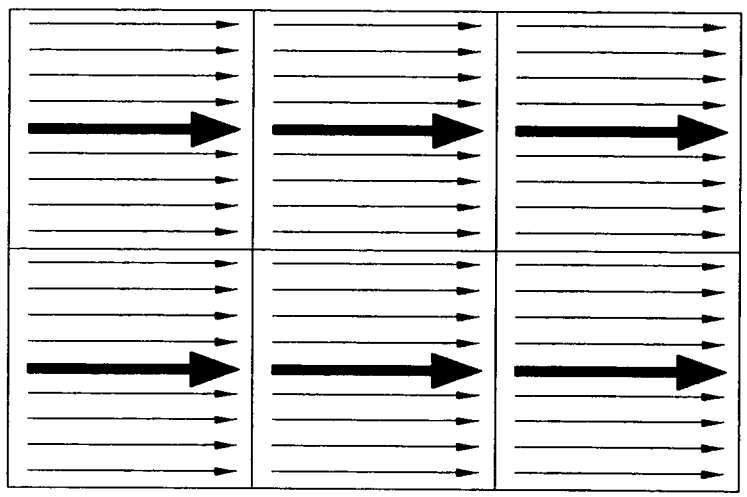

FIGS. 1A and 1B illustrate an example configuration of channel bands in a band AMC mode.

A configuration of channel bands used in the band AMC mode will now be described with reference to FIGS. 1A and 1B. Here, it is assumed that the band AMC mode is applied to a communication system that uses multiple subcarriers such as an Orthogonal Frequency Division Multiplexing (OFDM) system.

As can be seen from FIG. 1A, an OFDM channel includes null regions for preventing inter-channel interference at both edges of the OFDM channel and also includes bins, each including a predetermined number of subcarriers, and a DC subcarrier between the null regions. One bin includes 8 data subcarriers and one pilot, and 4 bins constitute one band.

In the example of FIG. 1A, one OFDM channel includes a total of 18 bands since the channel includes 192 bins. As described above, in the band AMC mode, a different Modulation & Coding Set (MCS) level can be set for each of the bands, thereby enabling efficient data transmission. In the broadband wireless access system, each subchannel has a 2×3 matrix format as shown in FIG. 1B.

A terminal in a band AMC mode reports a CINR of each band to a base station. Specifically, the terminal transmits respective CINRs of 4 or 5 bands with the best channel states to the base station. Here, the terminal can transmit the CINRs using an REP-RSP message. The base station allocates AMC subchannels to the bands with the best channel states. Once the band AMC subchannels are allocated, the terminal can report only a difference value (an incremental value) of an acquired CINR of each band from the previously-reported CINR through an REP-RSP message. The band AMC mode may also be initiated by the base station. Specifically, the base station can operate to send an REP-REQ to request initiation of the band AMC mode and the terminal can send an REP-RSP message in response to the REP-REQ message.

Figure 2:
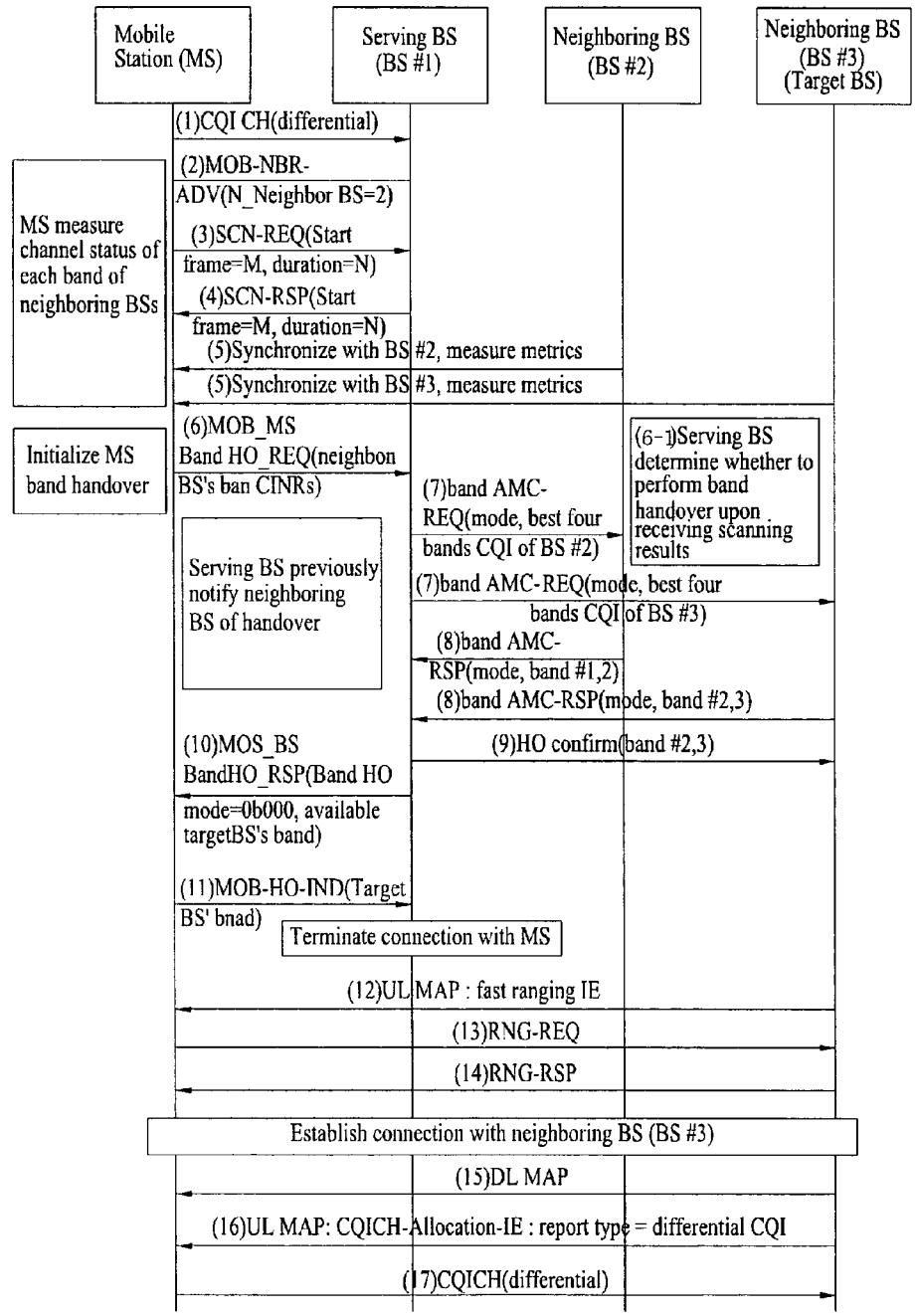
FIG. 2 is a flow chart illustrating a method for performing band handover according to an embodiment of the present invention.

FIG. 2 is a flow chart illustrating a method for performing band handover according to an embodiment of the present invention.

Here, it is assumed that a mobile terminal (or Mobile Station (MS)) is transmitting and receiving data in a band AMC mode (i.e., through band AMC subchannels allocated according to the above method). The base station allocates the mobile terminal uplink resources for transmission of downlink CQI information. Then, the mobile terminal transmits the downlink channel status information to the base station. Here, as shown in FIG. 2, at step 1, the mobile terminal that operates in the band AMC mode can transmit only a change in channel status information of each of 4 or 5 best bands from channel status information thereof, which was previously transmitted to the base station, to the base station through a CQICH. Although the channel status information is illustrated as being transmitted once in FIG. 2, the channel status information can be transmitted periodically.

Then, as shown in FIG. 2, at step 2, the mobile terminal receives information of neighboring base stations from a serving base station (Serving BS #1). The serving base station can transmit the neighboring base station information through an MOB-NBR-ADV message. In this case, the mobile terminal can also periodically receive the neighboring cell information. Here, the transmitted neighboring base station information may include information indicating the number of neighboring base stations (specifically, N_Neighbor BS=2) as shown in FIG. 2.

The mobile terminal may perform a scanning procedure by requesting scanning for neighboring base stations based on the neighboring base station information at step 3 and receiving a response to the scanning request at step 4. This response may include frame number (Frame=M) and duration (Duration=N) information of each neighboring base station as scanning parameters. Through this information, the mobile terminal can be synchronized with each neighboring base station to acquire channel status information of each neighboring base station at step 5. Especially, when the mobile terminal operates in the band AMC mode, the mobile terminal can determine a channel status of each band of each neighboring base station through such a scanning procedure. The channel quality information may be a CINR as described above and the scanning procedure may be performed as needed.

Then, the mobile terminal that operates in the band AMC mode can request that the base station perform band handover (Band HO) based on the scanning result at step 6. In this embodiment, band handover is performed in such a manner that the mobile terminal performs handover to a neighboring base station if it determines that the channel status of a band of the neighboring base station satisfies a predetermined handover condition while transmitting and receiving data through a specific band in the band AMC mode and then can transmit and receive data in the band AMC mode without additional processes after the handover is performed.

An example of the handover condition is that a maximum value of a standard deviation of a CINR of each band measured from a neighboring base station is less than a threshold value for band AMC allocation and an average CINR of all frequency bands of the neighboring base station is greater than a band AMC-enter average CINR.

Here, the mobile terminal can transmit an MOB_MS BandHO_REQ message to the base station at step 6 in order to request that the base station perform band handover. The MOB_MS BandHO_REQ message to be transmitted may include not only basic parameters required for the terminal to request band handover to the neighboring base station but also channel status information of each of 4 or 5 best bands among bands that the terminal has measured from neighboring base stations.

Table 1 illustrates an example format of the MOB_MS BandHO_REQ message.

TABLE 1

| Syntax | Size | Notes |
| --- | --- | --- |
| MOB_MS BandHO-REQ( ) { | | |
| Management Message Type = 57 | 8 bits | |
| Report metric | 8 bits | Bitmap indicating presence of metric in message<br>Bit #0: BS CINR mean<br>Bit #1: BS RSSI mean<br>Bit #2: Relative delay<br>Bit #3: BS RTD; this metric shall be only measured on serving BS/anchor BS. |

TABLE 1-continued

| Syntax | Size | Notes |
| --- | --- | --- |
| | | Bit #4: Band CINR mean |
| | | Bits #5-7: Reserved; shall be set to zero. |
| N_New_BS_Index | 8 bits | Number of new recommended BSs which are included in MOB_NBR-ADV message. |
| If(N_New_BS_Index!=0){ | | |
| Configuration change count for MOB_NBR-ADV | 8 bits | Configuration Change Count value of referring MOB_NBR-ADV message. |
| } | | |
| For(j=0;j< N_New_BS_Index;j++){ | | |
| Neighbor_BS_Index | 8 bits | |
| Preamble index/Preamble Present and Subchannel Index | 8 bits | For the SCa and OFDMA PHY this parameter defines the PHY specific preamble for the neighbor BS. For the OFDM PHY the 5 LSB contain the active DL subchannel index for the neighbor BS. The 3 MSB shall be Reserved and set to 0b000. |
| If(Report metric[Bit#0]==1) | | |
| BS CINR mean | 8 bits | |
| If(Report metric[Bit#1]==1) | | |
| BS RSSI mean | 8 bits | |
| If(Report metric[Bit#2]==1) | | |
| Relative delay | 8 bits | |
| Service level prediction | 3 bits | |
| Arrival Time Difference Indication | 1 bit | If the MS is transmitting this message to request HO or MDHO/FBSS is not supported by either BS or MS, this bit shall be set to 0. |
| If (Arrival Time Difference Indication == 1) { | | |
| Arrival Time Difference (t) | 4 bits | Relative difference in arrival time between the neighbor BS and the anchor BS, in terms of fraction of CP. |
| } | | |
| } | | |
| N_New_BS_Full | | |
| For(j=0;j< N_New_BS_Full;j++){ | | |
| Neighbor_BS_ID | 8 bits | |
| Preamble index/Preamble Present and Sub-channel Index | 8 bits | For the SCa and OFDMA PHY this parameter defines the PHY specific preamble for the neighbor BS. For the OFDM PHY the 5 LSB contain the active DL subchannel index for the neighbor BS. The 3 MSB shall be Reserved and set to 0b000. |
| If (Report metric[Bit#0] == 1) | | |
| BS CINR mean | 8 bits | |
| If(Report metric[Bit#1]==1) | | |
| BS RSSI mean | 8 bits | |
| If(Report metric[Bit#2]==1) | | |
| Relative delay | 8 bits | |
| Service level prediction | 3 bits | |
| Arrival Time Difference Indication | 1 bit | If the MS is transmitting this message to request HO or MDHO/FBSS is not supported by either BS or MS, this bit shall be set to 0. |
| If (Arrival Time Difference Indication == 1) { | | |
| Arrival Time Difference (t) | 4 bits | Relative difference in arrival time between the neighbor BS and the anchor BS, in terms of fraction of CP. |
| } | | |
| } | | |
| N_current_BSs | 3 bits | When FBSS/MDHO is supported and the MS has non-empty diversity set, N_current_BSs is the number of BSs that are currently in the Diversity Set of the MS When FBSS/MDHO is not supported or the MS has an empty diversity set, N_current_BSs is set to 1. |

TABLE 1-continued

| Syntax | Size | Notes |
|---|---|---|
| Padding | 1 bit | Shall be set to zero. |
| For (j=0 ; j<N_current_BSs ; j++) { | | |
| Temp BSID | 4 bits | Diversity Set member ID assigned to this BS. When the MS has an empty diversity set or FBSS/MDHO is not supported, Temp BSID shall be set to 0. |
| If(Report metric[Bit#0]==1) | | |
| BS CINR mean | 8 bits | |
| If(Report metric[Bit#1]==1) | | |
| BS RSSI mean | 8 bits | |
| If(Report metric[Bit#2]==1) | | |
| Relative delay | 8 bits | Only when FBSS/MDHO is in progress, this field will include the relative delay of BSs currently in the diversity set, except anchor BS. |
| If(Report metric[Bit#3]==1) | | |
| BS RTD | 8 bits | This field will include the RTD of the serving BS/anchor BS. |
| If(Report metric[Bit#4]==1){ | | |
| N_neighbor BS's best band | 4 bits | |
| For(j=0;j<N_neighbor BS's best band;j++){ | | |
| Neighbor BS's band bitmap index | 12 bits | |
| Neighbor BS Band CINR | 8 bits | |
| } | | |
| } | | |
| Padding | variable | Padding bits to ensure byte aligned. |
| TLV encoded information | variable | |
| } | | |

As shown in Table 1, when a report metric of the MOB_MS BandHO_REQ message indicates that channel status information of each band is included, the MOB_MS BandHO_REQ message that the mobile terminal transmits includes channel status information of each of 4 or 5 best bands among bands measured from each neighboring base station.

For example, when the report metric of the MOB_MS BandHO_REQ message indicates that channel status information of each band is included (Report metric [Bit#4]=1), the MOB_MS BandHO_REQ message may carry information indicating the number of best bands of a corresponding neighboring base station (N_neighbor BS's best band), bitmap index information indicating a corresponding band of the neighboring base station (Neighbor BS's band bitmap index), and channel status information of each of 4 or 5 best bands of the neighboring base station (Neighbor BS Band CINR).

Although FIG. 2 illustrates only the case where the mobile terminal requests band handover, the mobile terminal may report scanning results to the serving base station and the serving base station then may determine whether or not to perform band handover and then may perform a corresponding procedure according to the determination.

At step 7, based on channel status information of each band of each neighboring base station transmitted from the mobile terminal, the serving base station requests that each neighboring base station check whether or not band handover to the neighboring base station is possible and/or whether or not a service can be provided through the corresponding band. Then, at step 8, each neighboring base station transmits information of bands through which a service can be provided as a response to the request of step 7. Here, the request of step 7 and the response of step 8 can be performed through a band AMC-REQ message and a band AMC-RSP message, respectively.

The serving base station receives information of bands through which a service can be provided from each neighboring base station and determines that the best neighboring base station is a target base station to which handover is to be performed and transmits a handover confirmation message, including information of a band for which band handover is to be performed, to the target base station at step 9.

After the serving base station receives information of bands through which a service can be provided from each neighboring base station and determines that the best neighboring base station is a target base station to which handover is to be performed, the serving base station transmits a response to the band handover request including information indicating whether or not to perform band handover, information of the determined target base station, and information of bands through which a service can be provided from the target base station. Here, as shown in FIG. 2, the base station can transmit an MOB_BS BandHO_RSP message to the mobile terminal at step 10 in order to request that band handover be performed.

Table 2 illustrates an example format of the MOB_MS BandHO_RSP message.

TABLE 2

| Syntax | Size | Notes |
|---|---|---|
| MOB_BS Band HO-RSP( ) { | | |
| Management Message Type = 58 | 8 bits | |
| Mode | 4 bits | 0b000: HO/BandHO request<br>0b001: MDHO/FBSS request: Anchor BS update with CID update |

TABLE 2-continued

| Syntax | Size | Notes |
|---|---|---|
| | | 0b010: MDHO/FBSS request: Anchor BS update without CID update |
| | | 0b011: MDHO/FBSS request: Diversity Set update with CID update |
| | | 0b100: MDHO/FBSS request: Diversity Set update without CID update |
| | | 0b101: MDHO/FBSS request: Diversity Set update with CID update for newly added BS |
| | | 0b110: MDHO/FBSS request: Diversity Set update with CID update and CQICH allocation for newly added BS |
| | | 0b111: MS handover request not recommended (BS in list unavailable) |
| Reserved | 5 bits | Shall be set to zero. |
| If (Mode == 0b000) { | | |
| HO operation mode | 1 bit | 0: Recommended HO response. |
| | | 1: Mandatory HO response. |
| Band HO indicator | 1 bit | 1: Band HO mode |
| N_Recommended | 8 bits | |
| Resource Retain Flag | 1 bit | 0: Release connection information. |
| | | 1: Retain connection information. |
| Reserved | 6 bits | Shall be set to zero. |
| For(j=0 ; j<N_Recommended ; j++) | | |
| { | | Neighbor base stations shall be presented in an order such that the first presented is the one most recommended and the last presented is the least recommended. |
| Neighbor BSID | 48 bits | |
| Preamble index/Preamble Present and Sub-channel Index | 8 bits | For the SCa and OFDMA PHY this parameter defines the PHY specific preamble for the neighbor BS. For the OFDM PHY the 5 LSB contain the active DL subchannel index for the neighbor BS. The 3 MSB shall be Reserved and set to 0b000. |
| If(Band HO indicator == 1){ | | |
| N_Recommended band | 3 bits | |
| For(i=0;i< N_Recommended band;i++){ | | |
| Neighbor BS's band bitmap index | 12 bits | |
| } | | |
| } | | |
| Service level prediction | 8 bits | |
| HO process optimization | 8 bits | |
| Network Assisted HO supported | 1 bit | Indicates that the BS supports Network Assisted HO. |
| HO_ID_included_indicator | 1 bit | Indicates if the field HO_IND is included. |
| If (HO_ID_included_indicator == 1) { | | |
| HO_ID | 8 bits | ID assigned for use in initial ranging to the target BS once this BS is selected as the target BS. |
| } | | |
| HO_authorization policy indicator | 1 bit | To indicate if authorization negotiation is used in HO procedure. 0: EAP authorization and the value of the MAC mode field in the current BS (default) 1: The authorization policy for the target BS is negotiated. |
| Reserved | 4 bits | Shall be set to zero. |
| If (HO_authorization policy indicator == 1) { | | |
| HO_authorization_policy_support | 8 bits | Bit #0: RSA authorization |
| | | Bit #1: EAP authorization |
| | | Bit #2: Authenticated-EAP authorization |
| | | Bit #3: HMAC supported |
| | | Bit #4: CMAC supported |
| | | Bit #5: 64-bit Short-HMAC |
| | | Bit #6: 80-bit Short-HMAC |
| | | Bit #7: 96-bit Short-HMAC |
| } | | |
| } | | |
| } | | |
| else if (Mode == 0b001) { | | |
| Temp BSID | 3 bits | TEMP_BSID of the recommended |

TABLE 2-continued

| Syntax | Size | Notes |
| --- | --- | --- |
| AK Change Indicator | 1 bit | Anchor BS. To indicate whether the AK being used should change when switching to a new Anchor BS. If set to 0, the MS should continue to use the AK currently in use. If set to 1, the MS should use the AK derived for use with the new Anchor BS. |
| N_CIDs | 8 bits | Number of CIDs that need to be reassigned. For MDHO, N_CIDs shall be set to zero. |
| For (i= 0;i<N_CIDs;i++) { | | |
| New CID | 16 bits | New CID to be used after Diversity Set is updated. |
| } | | |
| N_SAIDs | 8 bits | Number of SAIDs that need to be reassigned. |
| For(i=0; i<N_SAIDs;i++) { | | |
| New SAID | 16 bits | New SAID to be used after Anchor BS is updated. |
| } | | |
| } | | |
| else if (Mode == 0b010) { | | |
| Temp BSID | 3 bits | TEMP_BSID of the recommended Anchor BS. |
| AK Change Indicator | 1 bit | To indicate whether the AK being used should change when switching to a new Anchor BS. If set to 0, the MS should continue to use the AK currently in use. If set to 1, the MS should use the AK derived for use with the new Anchor BS. |

As shown in Table 2, when the MOB_BS BandHO_RSP message indicates that the handover mode is band handover, information of each band that can be used to provide a service through the band handover from among bands of the target base station is included in the MOB_BS BandHO_RSP message to be transmitted.

For example, as shown in Table 2, when the MOB_BS BandHO_RSP message indicates band handover (i.e., Band HO indicator=1), information (N_Recommended band Neighbor) indicating the number of bands that can be used for providing a service through band handover of the target base station and bitmap index information (BS's band bitmap index) indicating each band that can be used to provide a service through band handover can be transmitted through the MOB_BS BandHO_RSP message.

The mobile terminal confirms the target base station that will perform handover, the band information, etc., and instructs that band handover to the target base station be performed. This process can be performed through an MOB-HO-IND message at step 11 as shown in FIG. 2.

The mobile terminal terminates a connection established with the serving base station and performs a ranging and network entrance procedure with the base station to which band handover will be performed (i.e., with the target base station). This procedure is performed at steps 12 to 14 as shown in FIG. 2.

When band handover to the target base station is performed and registration of the mobile terminal in the target base station is completed, the target base station becomes a new serving base station of the mobile terminal. The mobile terminal receives DL/UL scheduling information (for example, a DL/UL MAP message) from the new serving base station to receive a CQICH allocation IE required for the mobile terminal to transmit channel quality information to the new serving base station.

Specifically, at step 16, the new serving base station transmits CQICH allocation information to the mobile terminal to allocate a new CQICH to the mobile terminal and the mobile terminal periodically determines channel quality information of the new serving base station and transmits the channel quality information to the new serving base station through the newly allocated CQICH at step 17.

Here, the mobile terminal can transmit channel quality information of all frequency bands to the new serving base station. Since the mobile terminal has performed handover while maintaining the band AMC mode and has already acquired the channel information of each band of the new serving base station at step 6, the mobile terminal can transmit only a changed value in the channel quality information of each of the 4 or 5 best bands of the base station from the previously-transmitted channel quality information thereof.

Table 3 illustrates an example configuration of an Information Element (IE) for transmitting CQICH allocation information.

TABLE 3

| Syntax | Size | Notes |
| --- | --- | --- |
| CQICH_Alloc_IE( ) ( ) { | | |
| Extended UIUC | 4 bits | CQICH = 0x03 |

TABLE 3-continued

| Syntax | Size | Notes |
|---|---|---|
| Length | 4 bits | Length of the message in bytes (variable). |
| CQICH_ID | variable | Index to uniquely identify the CQICH resource assigned to the SS. The size of this field is dependent on system parameter defined in DUCD. |
| Report mode | 1 bit | 0: average mode; the MS reports the regular CQI of the whole bandwidth<br>1: differential mode; the MS reports the band AMC differential CQI of the selected bands |
| Allocation offset | 6 bits | Index to the fast-feedback channel region marked by UIUC = 0. |
| Period (p) | 2 bits | A CQI feedback is transmitted on the CQICH every $2^p$ 2pframes. |
| Frame offset | 3 bits | The SS starts reporting at the frame of which the number has the same 3 LSB as the specified frame offset. If the current frame is specified, the SS should start reporting in eight frames. |
| Duration (d) | 3 bits | A CQI feedback is transmitted on the CQI channels indexed by the CQICH_ID for $10 \times 2^d$ frames. If d == 0, the CQICH is deallocated.<br>If d == 0b111, the SS should report until the BS command for the SS to stop. |
| Report configuration included | 1 bits | Update to CINR report configuration is included. |
| If (report configuration included == 1) { | | |
| Feedback Type | 2 bits | 0b00 = physical CINR feedback<br>0b01 = effective CINR feedback<br>0b10-0b11 = Reserved |
| Report type | 1 bit | 0: Report for preamble<br>1: Report for specific permutation zone |
| If (Report type == 0) { | | |
| CINR preamble report type | 1 bit | The type of preamble-based CINR report<br>0: Frequency reuse factor = 1 configuration.<br>1: Frequency reuse factor = 3 configuration. |
| }<br>Else { | | report for permutation zone. |
| Zone permutation | 3 bits | The type of zone for which to report<br>0b000: PUSC with 'use all SC = 0'<br>0b001: PUSC with 'use all SC = 1'<br>0b010: FUSC<br>0b011: Optional FUSC<br>0b100: Safety Channel region<br>0b101: AMC zone (for DL AAS zone or AMC Zone with dedicated pilots)<br>0b110-0b111: Reserved |
| Zone type | 2 bits | 0b00: Non-STC zone<br>0b01: STC zone<br>0b10: AAS zone or Non-STC zone with dedicated pilots<br>0b11: STC zone with dedicated pilots |
| Zone PRBS_ID | 2 bits | The PRBS_ID of the zone on which to report |
| If (Zone type == 0b000 or 0b001) { | | |
| Major group indication | 1 bit | If 0 then the report may refer to any subchannel in the PUSC zone. |
| If (Major group indication == 1) { | | |
| PUSC Major group bitmap | 6 bits | Reported CINR shall only apply to the subchannels of PUSC major groups for which the corresponding bit is set.<br>Bit #k refers to major group k. |
| }<br>} | | |
| CINR zone measurement type | 1 bit | 0: measurement from pilot subcarriers and, if AAS zone, from AAS preamble.<br>1: measurement from data subcarriers |
| } | | |

TABLE 3-continued

| Syntax | Size | Notes |
|---|---|---|
| If (feedback type == 0b00) {<br>Averaging parameter included<br>If (Averaging parameter included == 1) { | 1 bit | Physical CINR feedback |
| Averaging parameter | 4 bits | Averaging parameter used for deriving physical CINR estimates reported through CQICH. This value is given in multiples of 1/16 in the range of [1/16..16/16] in increasing order. αavg |
| }<br>}<br>}<br>MIMO_permutation_feedback_cycle | 2 bits | 0b00 = No MIMO and permutation mode feedback<br>0b01 = The MIMO and permutation mode indication shall be transmitted on the CQICH indexed by the CQICH_ID every four frames allocated CQICH transmission opportunity. The first indication is sent on the eighthfourth allocated CQICH frame transmission opportunity.<br>0b10 = The MIMO mode and permutation mode indication shall be transmitted on the CQICH indexed by the CQICH_ID every eight frames allocated CQICH transmission opportunity. The first indication is sent on the eighth allocated CQICH frame transmission opportunity.<br>0b11 = The MIMO mode and permutation mode indication shall be transmitted on the CQICH indexed by the CQICH_ID every 16 frames allocated CQICH transmission opportunity. The first indication is sent on the 16th allocated CQICH frame transmission opportunity. |
| Padding | variable | The padding bits is used to ensure the IE size is integer number of bytes. Number of bits required to align to byte length, shall be set to zero. |
| } | | |

As shown in Table 3, whether channel quality information of all bands is to be transmitted or a change in channel information of each band from the previously transmitted channel information of each band is to be transmitted can be confirmed through a report mode in the CQICH allocation information. That is, when the report mode indicates that the change is to be transmitted (i.e., report mode=1), the mobile terminal can transmit, as channel quality information, only a change in the channel information of each band from the channel information transmitted before the band handover is performed through the allocated CQICH. The change in the channel information of each band from that transmitted before the band handover is performed may include an increase or decrease from the transmitted channel information or a value indicating whether an increase or decrease has been made from the transmitted channel information.

On the other hand, the above processes for sharing band resources between neighboring base stations and managing the resources can be performed at equipment (for example, a band resource controller) provided separately from the serving base station.

Reference will now be made to a structure of a mobile terminal that supports the band AMC method using sharing of resources with neighboring base stations according to the present invention.

Figure 3:
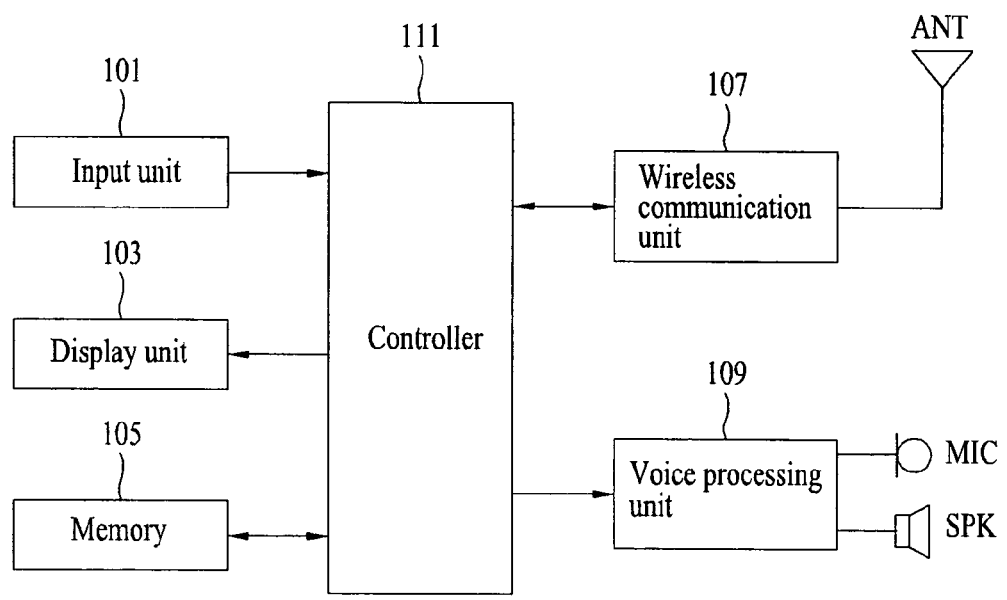
FIG. 3 is a block diagram illustrating a configuration of the mobile terminal according to the present invention.

FIG. 3 is a block diagram illustrating a configuration of the mobile terminal according to the present invention.

The mobile terminal includes an input unit 101, a display unit 103, a memory 105, a wireless communication unit 107, a voice processing unit 109, and a controller 111. The input unit 101 allows a user to select a desired function or to input desired information. The display unit 103 displays a variety of information for operating the mobile terminal. The memory 105 stores a variety of programs required to operate the mobile terminal and data to be transmitted to a receiving side. The wireless communication unit 107 receives external signals and transmits data to a receiving side. The voice processing unit 109 converts a digital voice signal into an analog voice signal and amplifies and outputs the analog voice signal to a speaker SP or amplifies and converts a voice signal from a microphone MIC into a digital signal. The controller 111 controls overall operations of the mobile terminal.

Specifically, the controller 111 periodically scans neighboring base stations to determine a channel status of each band of each neighboring base station and requests that a serving base station perform band handover to a neighboring base station when the determined channel status of each band of the neighboring base station satisfies a predetermined condition.

If the serving base station has requested that the mobile terminal provide the determined channel status information, the controller 111 performs the band handover request through a response message to the request from the serving base station. Other specific functions of the mobile terminal for performing band handover have already been described in detail in the above method for performing band handover.

A Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, or the like may be used as the mobile terminal of the present invention.

It will be apparent that claims which are not explicitly dependent on each other can be combined to provide an embodiment or new claims can be added through amendment after this application is filed.

The embodiments of the invention can be implemented by hardware, firmware, software, or any combination thereof. In the case where the invention is implemented by hardware, an embodiment of the invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the invention is implemented by firmware or software, the method for performing band handover in a broadband wireless access system according to an embodiment of the present invention may be implemented in the form of modules, processes, functions, or the like which perform the features or operations described above. Software codes can be stored in a memory unit so that they can be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention can be applied to a terminal, a base station, or other equipment in a wireless mobile communication system.

The invention claimed is:

1. A method for performing band handover in a broadband wireless access system, the method comprising:
transmitting, by a terminal to a serving base station, a band handover request message which indicates channel status information of a neighboring base station,
wherein the band handover request message includes:
channel status information of best bands among all bands measured from the neighboring base station, information indicating the number of the best bands, and bitmap index information indicating the best bands,
the terminal operating in a band AMC (Adaptive Modulation and Coding) mode in which data is transmitted and received through a band selected from among bands to which a modulation scheme and a coding rate are adaptively applied; and
performing, by the terminal, handover to the neighboring base station while maintaining the band AMC mode if it is determined based on the channel status information that a channel status of each band of the neighboring base station satisfies a predetermined condition,
wherein the channel status information is a CINR (carrier to interference and noise ratio) value, and
wherein the predetermined condition comprises
a maximum value of a standard deviation of a CINR of each band measured from the neighboring base station being less than a threshold value for band AMC allocation, and
an average CINR of all frequency bands of the neighboring base station being greater than a band AMC-enter average CINR.

2. The method according to claim 1, further comprising:
receiving additional channel status information of each band from the neighboring base station after performing handover to the neighboring base station.

3. The method according to claim 2, wherein the additional channel status information of each band received after performing the handover is an incremental value in the channel status information of each band from the channel status information received before performing the handover.

4. A method for performing band handover in a broadband wireless access system, the method comprising:
transmitting, by a terminal to a serving base station, a band handover request message which indicates channel status information of a neighboring base station,
wherein the band handover request message includes,
channel status information of best bands among all bands measured from the neighboring base station, information indicating the number of the best bands, and bitmap index information indicating the best bands,
the terminal performing data transmission and reception through a band selected from among bands that is available for allocation in the broadband wireless access system; and
performing, by the terminal, handover to the neighboring base station, if it is determined based on the channel status information that a channel status of each band of the neighboring base station satisfies a predetermined condition, in order to transmit and receive data through the selected band to and from the neighboring base station,
wherein the channel status information is a CINR (carrier to interference and noise ratio) value, and
wherein the predetermined condition comprises
a maximum value of a standard deviation of a CINR of each band measured from the neighboring base station being less than a threshold value for band AMC (Adaptive Modulation and Coding) allocation, and
an average CINR of all frequency bands of the neighboring base station being greater than a band AMC-enter average CINR.

5. The method according to claim 4, further comprising:
receiving additional channel status information of each band after performing the handover,
wherein the additional channel status information of each band received after performing the handover is an incremental value in the channel status information of each band from the channel status information received before performing the handover.

6. A mobile terminal for performing handover in a broadband wireless access system, the mobile terminal comprising:
a receiver configured to transmit, to a serving base station, a band handover request message which indicates channel status information of a neighboring base station, wherein the band handover request message includes:
   channel status information of best bands among all bands measured from the neighboring base station, information indicating the number of the best bands, and bitmap index information indicating the best bands,
the terminal operating in a band AMC (Adaptive Modulation and Coding) mode in which the terminal transmits and receives data through a band selected from among bands to which a modulation scheme and a coding rate are adaptively applied; and
a controller configured to control the mobile terminal to perform handover to the neighboring base station while maintaining the band AMC mode if it is determined based on the channel status information that a channel status of each band of the neighboring base station satisfies a predetermined condition,
wherein the channel status information is a CINR (carrier to interference and noise ratio) value, and wherein the predetermined condition comprises
   a maximum value of a standard deviation of a CINR of each band measured from the neighboring base station being less than a threshold value for band AMC allocation, and
   an average CINR of all frequency bands of the neighboring base station being greater than a band AMC-enter average CINR.

7. The mobile terminal according to claim 6, wherein the receiver is further configured to receive additional channel status information of each band from the neighboring base station after performing handover to the neighboring base station.

8. The mobile terminal according to claim 7, wherein the additional channel status information of each band received after performing the handover is an incremental value in the channel status information of each band from the channel status information received before performing the handover.

* * * * *